United States Patent [19]
Patel

[11] Patent Number: 5,315,636
[45] Date of Patent: May 24, 1994

[54] PERSONAL TELECOMMUNICATIONS SYSTEM

[75] Inventor: Rajendra Patel, Plano, Tex.

[73] Assignee: Network Access Corporation, Richardson, Tex.

[21] Appl. No.: 723,169

[22] Filed: Jun. 28, 1991

[51] Int. Cl.⁵ .......................................... H04M 11/00
[52] U.S. Cl. ........................................ 379/58; 379/59; 379/60; 379/63
[58] Field of Search ...................... 379/57, 58, 59, 60, 379/63

[56] References Cited

U.S. PATENT DOCUMENTS

| | | | |
|---|---|---|---|
| 3,575,558 | 4/1971 | Leyburn et al. | 379/57 |
| 4,065,642 | 12/1977 | McClure | 379/209 |
| 4,233,473 | 11/1980 | Frost | 379/59 |
| 4,399,330 | 8/1983 | Kuenzel | 379/58 |
| 4,658,416 | 4/1987 | Tanaka | 379/60 |
| 4,672,656 | 6/1987 | Pfeiffer et al. | 379/57 |
| 4,680,785 | 7/1987 | Akiyama et al. | 379/57 |
| 4,748,655 | 5/1988 | Thrower et al. | 379/57 |
| 4,752,951 | 6/1988 | Konneker | 379/211 |
| 4,775,997 | 10/1988 | West, Jr. et al. | 379/57 |
| 4,876,708 | 10/1989 | Saegusa et al. | 379/61 |
| 4,878,243 | 10/1989 | Hashimoto | 379/211 |
| 4,893,336 | 1/1990 | Wuthnow | 379/210 |
| 4,980,907 | 12/1990 | Raith et al. | 379/63 |
| 5,151,929 | 9/1992 | Wolf | 379/57 |
| 5,153,902 | 10/1992 | Buhl et al. | 379/60 |
| 5,197,092 | 3/1993 | Bamburak | 379/59 |
| 5,235,633 | 8/1993 | Dennison et al. | 379/60 |

FOREIGN PATENT DOCUMENTS 2193861 2/1988 United Kingdom.

OTHER PUBLICATIONS

"EMX Electronic Switching Equipment" by Motorola.
"Personal Pocket Phones" by John Free; Popular Science, Aug. 1990.
"Intelligent Telephone" Washington Post; Jan. 14, 1993.

Primary Examiner—Stephen Chin
Assistant Examiner—Vijay Shankar
Attorney, Agent, or Firm—Harold E. Meier

[57] ABSTRACT

The location independent personal telecommunications system of the present invention enables a subscriber to have a single personal telephone directory number. When that personal telephone number is dialed, the system uses the existing public and cellular communication systems and a service node all comprising parts of the personal telecommunications system to route the call to the present, or last known location of the subscriber. The location of the subscriber is determined by the personal telecommunications system through a radio tracking system comprised of a number of radio base stations that monitor the subscriber's location by communicating with a personal communicator carried by the subscriber. The subscriber location information is transmitted from the base stations to the service node for storage and subsequent access when a call is placed to the subscriber's personal telephone number. The service node will then transfer the call to the proper telephone number at the location where the subscriber is currently, or last known to be located, or if not at a fixed location with a known phone, notify the subscriber through the base stations and the personal communicator of the incoming call.

27 Claims, 3 Drawing Sheets

PERSONAL TELECOMMUNICATIONS SYSTEM

TECHNICAL FIELD

The present invention relates to the field of personal telecommunications, and in particular to a location independent personal telecommunications system that utilizes a radio messaging system and existing public and cellular telephone communications systems to enable a caller to contact a system subscriber at any location by dialing a single personal telephone number.

BACKGROUND OF THE INVENTION

In today's fast paced, complex and business oriented society, it has become increasingly important for some people to be accessible to personal communications at all times. For example, a professional such as a doctor or attorney may need to be constantly available for communications from present and prospective colleagues, patients, clients, family or friends. Other persons in service related fields, for example, repair persons, sales persons, delivery persons and construction contractors and workers, also need to be accessible for communications at all times so that they can serve their customers efficiently. Unfortunately, those persons who require instantaneous communications accessibility are rarely present at a single location where they can be reached by callers via normal telephone service. Locating and communicating with these people is further frustrated by the fact that they rarely maintain a fixed schedule or itinerary.

In order to be accessible for communications at all times, these persons typically obtain one of two communications services; and in fact several of these persons obtain both services. First, the person may engage a paging service to receive and report phone calls made to a selected primary phone number maintained by the person at home, office or some other fixed location. Calls made to the primary number are screened by the paging service and the person notified by phone call or pager with regard to the most important or pressing calls. Alternatively, the calls are recorded by the service on a message board for subsequent call in and recovery. Second, the person may choose to have phone lines installed in a number of important locations frequented by the person to enable communications contact. Both service options share one drawback in that they are expensive to maintain on a monthly basis. The paging service is undesirable as there is no personal communication between the caller and the person. The second service option is undesirable as it requires a caller to locate and remember all phone numbers associated with the separate locations frequented by the person (for example, home, office and cellular). An additional drawback to the multiple phone line service option is that callers often must sequentially dial each number for each location, often more than one time, before finally being able to reach the desired person.

The additional drawbacks and difficulties experienced with persons who maintain separate location communications facilities are apparent and are encountered by frustrated callers on an almost everyday basis. For example, in trying to reach your physician in an emergency situation you would first attempt to contact the office requiring the caller to first locate the doctor's office telephone number. After contacting the receptionist at the office or reaching a message centers the caller may be told that the doctor is at another office, at home or at the hospital requiring the patient to locate and dial more telephone numbers. Again, the doctor may not be at any of the designated locations, but may in fact be in a car and reachable only through a cellular communications service that requires the locating and dialing of yet another number. The process of locating all dialing phone numbers can go on ad infinitum until the doctor is finally located and contacted. In the alternative, the caller may eventually realize that the doctor is not at any of the regular locations and is effectively unreachable.

Accordingly, there is a need for a personal telecommunications service that will provide location independent communications service for a subscribing individual that will enable a caller to contact the subscriber for personal communication or message transmission by dialing a single personal communications phone number.

SUMMARY OF THE INVENTION

The present invention comprises a location independent personal telecommunications system that enables a subscriber to have a single personal telephone directory number. The system functions by routing the incoming call to the personal telephone number to a telephone at the subscriber's current location or notifying the subscriber of the call if telephonic communication is not available. An incoming call made to the personal telephone number assigned to the subscriber is routed by the existing public communications network to a service node dedicated to the personal telecommunications system The service node then instantly accesses the subscriber's current, or last known location and routes the incoming call to the proper directory telephone number for that location. The location of the subscriber is determined by the personal telecommunications system through a radio messaging system that monitors and tracks the subscriber's location by means of a personal communicator carried by the subscriber. This location information is stored in a look-up table at the service node along with communications routing information and accessed as needed to route incoming personal telephone calls.

With the personal telecommunications system of the present invention, the telephone numbers assigned to the phone lines at primary locations frequented by the subscriber, such as a home, office or cellular, are not affected, deleted or changed. In fact, the system of the present invention utilizes those numbers to transfer the incoming call made to the subscriber's personal telephone number to the phone number for the existing phone line at the location where the subscriber is currently located. Thus, there is no need to change the subscriber's existing communications services and persons may still call those numbers without accessing the personal telecommunications system. The service provided by the present invention is an additional service available to a person who requires communications accessibility through the dialing of a single phone number.

The radio messaging system utilized to monitor and track the location of the subscriber comprises a central base station located at the service node and a plurality of remote radio base stations located at selected fixed and known locations. Each base station maintains periodic radio contact with the personal communicator carried by each subscriber. A set of primary remote base stations are located at each subscriber's primary communications locations, such as home, office or cellular. Other remote base stations are located at popular gathering places such as sporting facilities, shopping malls and restaurant areas, or on top of buildings or in other structures around the subscribers' living, working and playing areas. The personal communicator is a credit card sized device that easily fits in the subscriber's shirt, briefcase, wallet or purse. The communicator contains a limited range radio transceiver, display device and function keypad coupled to a dedicated processing circuit. Through the transceiver, the communicator and the nearest remote base station maintain radio communication to continually update the present location of the subscriber.

Each remote base station periodically polls its surrounding area for proximately located subscriber personal communicators. Each personal communicator in the area responds by notifying the polling base station of the subscriber's presence. This location information is then relayed by the network of remote base stations to the central base station at the personal telecommunications system service node where the subscriber's current location and communications routing information is updated and stored in a look-up table in anticipation of future need.

Upon receipt of an incoming call to the personal telephone number, the service node will access the subscriber's current known location from the look-up table to inform the subscriber of the incoming call and deliver the phone call if possible according to the accessed routing information. If the subscriber's current location is at home, office or a cellular location, the service node will access the appropriate telephone or cellular number for that location from the look-up table and route the call to the subscriber. If the subscriber's current location is not their home, office or cellular location, the service node knows not to route incoming calls via public telephone lines or cellular lines, and instead accesses from the look-up table and contacts the base station last in communication with the subscriber's personal communicator to route an alarm message and notify the subscriber of the call in the same manner as a pager service would operate. With notice of the call, the subscriber can choose to execute one of many functions to respond to the incoming call, including putting the caller on hold or taking a message for a later return call.

Other features and services, originating with each subscriber using the personal communicator function keys, are available to the subscriber through the radio messaging system and the service node. These services are available to the subscriber regardless of the subscriber's location. For example, the subscriber can access the service node over an adjacently located telephone manually or directly through the personal communicator and use speed dialing, three-way calling, call waiting, voice activated dialing or other features. In addition, the subscriber can signal, through the personal communicator, an emergency situation. This signal will be transmitted to the service node where emergency aid will be summoned with the subscriber's location being determined by the radio messaging system. The subscriber can also attach a mini alphanumeric keyboard to the personal communicator and transmit text messages over the radio messaging system to the service node for further transmission to the intended destination.

As can be seen through the foregoing description, the personal telecommunications system of the present invention allows a subscriber requiring immediate communications accessibility at a number of locations to be contacted by a caller through the identification and dialing of a single telephone number. The system also provides a number of additional communications features that may be originated with the subscriber at the personal communicator for transmission via the radio messaging system. This system minimizes the frustration historically encountered by persons forced to locate highly mobile persons by accessing and dialing a series of phone numbers and enables highly mobile individuals to maintain communications accessibility at all times.

BRIEF DESCRIPTION OF THE DRAWINGS

Other applications for, and a more complete understanding of the personal communications system of the present invention will become apparent by reference to the following Detailed Description when taken in conjunction with the accompanying Drawings wherein.

DETAILED DESCRIPTION OF THE DRAWINGS

Figure 1:
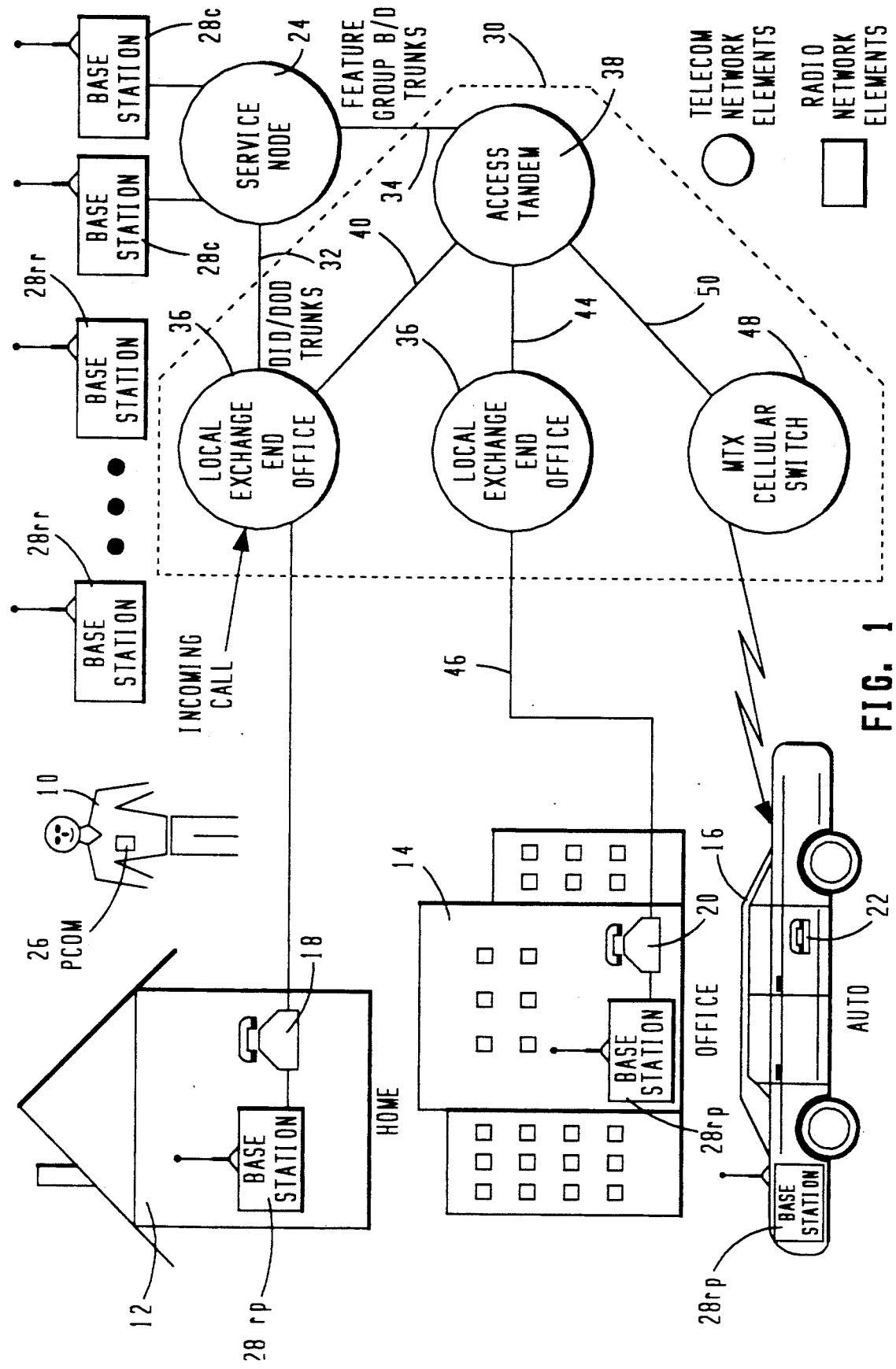
FIG. 1 is a block diagram for the personal telecommunications system of the present invention.

Referring now to FIG. 1, there is shown a block diagram for the personal telecommunications system of the present invention that enables a subscriber 10 to be located and accessed for communications through the dialing of a single personal telephone number regardless of location. The subscriber 10 is typically a business person or professional who needs to be constantly available for communications from present and prospective colleagues, clients, family or friends. Because of the subscriber's lifestyle, the subscriber 10 is rarely located at a single or fixed location for an extended period of time. Normally, the subscriber 10 can be called at one of several primary locations that include the subscriber's home 12, office 14 or vehicle 16. The subscriber may additionally be present for a period of time at other locations such as restaurants, shopping malls or sporting facilities where the subscriber can be contacted at a public phone if the number is known.

The telephone numbers for the phones 18, 20 and 22 at home 12, office 14 and vehicle 16, respectively, are, as has historically been the case, location specific in that the number is assigned by the telephone carrier or cellular carrier to a phone located at a certain place. However, even with assigned phone numbers, communication is difficult because the subscriber 10 is not predictably or certainly located at a particular phone. In such situations, a caller may fruitlessly attempt to track down the subscriber 10 by calling the phones at home 12, office 14 or vehicle 16 only to find the subscriber not present or in transit between locations or at a separate location where the phone number is unknown.

With the personal telecommunications system of the present invention, the subscriber 10 is assigned a personal telephone directory number. Callers dialing that personal number will have their calls automatically routed by the system to a phone at the subscriber's current location. If the subscriber 10 is not at a location with a known phone number, then the system will provide an alert message to the subscriber for notification of the incoming call.

The personal telecommunications system comprises a dedicated service node 24, a personal communicator 26 assigned to each subscriber 10 and a plurality of base stations 28 operated in conjunction with an existing public switched telecommunications network 30. The service node 24 is an intelligent network platform that is the central hub for the processing of incoming calls dialed to a subscriber's 10 personal telephone number. The service node 24 also handles outgoing calls as directed by the subscriber. The service node 24 uses trunk connections 32 and 34 to interface with the public switched network 30. Trunk line 32 comprises a group of direct inward dial (DID)/direct outward dial (DOD) trunk lines that provide a voice path and directory number for incoming and outgoing calls for the personal telephone number assigned to the subscriber 10. Incoming calls dialed to a subscriber's 10 personal phone telephone number are directed by a local exchange end office 36 to the system service node 24 over trunk line 32. The system service node 24 will provide audible ringback to the caller and provide answer indication on incoming calls.

The DID/DOD trunk line 32 and trunk line 34, which is a feature group B/D trunk, are used to redirect and output (route) incoming calls from the DID trunk line 32 to the proper destination telephone at the subscriber's current location. The feature group B/D trunk line 34 routes the incoming call through the access tandem 38 of the public switched network 30 to the proper local exchange end office 36. The DID/DOD trunk line 32 routes incoming call out directly to its associated local exchange end office 36. It will of course be understood that the system may utilize other trunk line types should the service become available from the local carrier. For example, the DID/DOD and feature group B/D trunk lines could be converted to primary rate access and feature group K trunks thus enhancing the operation of the system by enabling the system to receive originating caller information, identification and call screening services.

The service node 24 contains equipment for receiving, originating and routing calls to and from the public switched network 30, for providing interactive feature management for users of the node and for interfacing the radio messaging system. The service node uses two types of intelligent network platforms; a network interface platform and an information services platform. The network interface platform provides trunk line access, switching, monitoring, signalling and low level call control. The information services platform is a collection of system resources and is home of the control computer for the service node. The manner of operation of the service node is determined by the particular resident applications program executed by the service node's computers. U.S. Pat. Nos. 4,903,263, 4,853,955 and 4,782,519, and application for patent Ser. No. 07/469,093 disclose the hardware implementation of the service node 26 utilized by the system of the present invention.

The personal telecommunications system does not affect the telephone numbers assigned to the phones 18, 20 and 22 at the subscriber's home 12, office 14 and vehicle 16, respectively. In fact, these numbers are stored by the service node 24 in a look-up table (along with other routing and identification information) and accessed in order to route incoming DID trunk 32 calls for the personal telephone number through the proper local exchange end office 36 to the place (home 12, office 14 or vehicle 16) where the subscriber 10 is currently located.

For example, if the subscriber 10 is at home 12, the incoming call to the subscriber's personal telephone number will be routed by the service node 24 and access tandem 38 to the directory number assigned to the home phone 18. The incoming call will be completed by directing the incoming call to the home phone 18 via local exchange end office 36 and lines 40 and 42. Similarly, if the subscriber 10 is at the office 14, the incoming call to the subscriber's personal telephone number will be rerouted by the service node 24 and access tandem 38 to the directory number assigned to the office phone 20. The call is completed via the local exchange end office 36 and lines 44 and 46. Finally, if the subscriber 10 is located at the vehicle 16, the service node 24 and access tandem 38 will redirect the incoming call to the assigned cellular number for the vehicle telephone 22. The call is completed via the cellular network using the local MTX cellular switch 48 and line 50. The system thus allows the subscriber 10 to be reached for communication through the dialing of a single phone number as processed by the service node 24.

The location of the subscriber 10 is determined by the personal telecommunications system through an included radio messaging system that monitors and tracks the location of system subscribers by means of a personal communicator 26 carried by each subscriber in radio communication with a network of base stations 28 and the service node 24. A pair of central base stations 28c are coupled to the service node 24 to insure continuous communication with the service node 24 in the event one central base station malfunctions. Additional remote base stations 28r are placed at predetermined, periodic locations in the geographic area serviced by the system. These remote base stations 28r are of two different types, a relay base station 28rr and a primary base station 28rp.

Primary base stations 28rp are base stations located in each subscriber's 10 primary communications locations, such as home 12, office 14 and vehicle 16. The primary base stations 28rp are placed in the vicinity of the phone 18, 20 and 22 at each primary location. Primary base stations 28rp may also be located in heavy traffic areas such as restaurants, sports facilities, office buildings, shopping malls and airports. Each primary base station 28rp, no matter where located, may be shared by several subscribers 10.

The purpose of each primary base station 28rp is to detect the presence of an assigned personal communicator 26, and hence a designated subscriber 10, within several hundred feet of its location. If the personal communicator 26 is located, the base station 28rp will transmit subscriber location information over the radio messaging system to the service node 24. The primary base stations 28rp can also function to transmit messages from the service node 24 to each personal communicator 26 using the radio messaging system and search for stray (non-assigned or non-designated) personal communicators within the service range of the base station. The primary base stations 28rp are also connected for back-up purposes to their associated telephone to enable the base station to contact and communicate with the service node 24 via public or cellular communications service in the event to the radio messaging system fails.

The relay base stations 28rr are used by the radio messaging system to facilitate the relaying of information from the primary base stations 28rp and other relay base stations 28rr to the central base station 28c at the service node 24. The relay base stations 28rr can also broadcast directly to the personal communicators 26 for providing alert messages on incoming calls to the subscriber and for searching for stray personal communicators within their coverage area.

Each base station 28, whether primary, relay or central, has an approximately ten mile radius effective inter-base station communication range. Subscriber location information transmitted via the radio messaging system thus may necessarily travel through and be relayed by several base stations 28 prior to being received at the central base station 28c and processed by the service node 24. Upon receipt of subscriber location information over the radio messaging system, the service node 24 stores the data and updates the last known subscriber location on a look-up table to reflect the most recent tracking information on each subscriber. With this information, the service node 24 will know where to direct any incoming calls directed to the subscriber's personal telephone number.

Each personal communicator 26 and base station 28 is assigned a unique identification number. Each primary base station 28rp is assigned one or more designated personal communicators 26 to which it has primary communications, tracking and locating responsibility. For example the remote base stations 28rp at the subscriber's home 12, office 14 and vehicle 16 will be assigned to the subscriber's personal communicator 26. The identification numbers for base stations 28 and personal communicators 26 are stored in the look-up table at the service node 24 used to route messages within the radio messaging system. The identification number of the remote base station 28r last in contact with the subscriber's personal communicator is stored by the service node 24 in the look-up table with the subscriber's personal communicator identification number and the directory telephone number of the phone at the subscriber's current location, if applicable.

A primary remote base station 28rp detects the presence of a personal communicator 26 by periodically broadcasting "are you there?" messages to the identification numbers for each of its assigned personal communicators. An assigned personal communicator 26 within the transmit range of its assigned remote base station 28rp will respond with an "I am here" message. This indicates that the personal communicator 26, and hence its assigned subscriber 10, are within the coverage zone of the assigned remote base station 28rp. The subscriber is thus located. The base station 28rp will then send a message over the radio messaging system to the service node 24 to update the current location of the subscriber. The identification number for the remote base station in communication with the subscriber's personal communicator 26 is stored by the service node 24 in the look-up table for access and use should the subscriber's personal phone number be dialed.

If the primary base station 28rp does not receive an appropriate response from its assigned personal communicator 26, it will assume that the subscriber 10 is not present within the transmit range of the base station. If the remote base station 28rp had previously detected the presence of the subscriber's personal communicator 26 and on the subsequent broadcast received no response, the remote base station will again attempt to communicate with the personal communicator and, if there is no response, then transmit a message via the radio messaging system to the service node 24 that the subscriber has changed locations. If the remote base station 28rp had not previously detected the presence of an assigned personal communicator 26, it will continue to request presence on a periodic basis and inform the service node 24 when the assigned personal communicator is detected.

The remote base stations, both primary 28rp and relay 28rr, also periodically look for stray personal communicators 26. A stray is a personal communicator having an identification number to which the base station is not assigned. At periodic intervals, each remote base station 28r broadcasts a message requesting all personal communicators 26 within range to respond. In order to prevent all in range personal communicators 26 from simultaneously transmitting "I am here" messages to the requesting remote base station 28r, a sequencing algorithm is used to cue the personal communicators for response. According to the algorithm, each personal communicator 26 will delay responding for a unique time period based on the personal communicator identification number combined with a value indicating the length of time the responding personal communicator has been outside the range of a base station. This sequencing algorithm thus prevents communicator identification message collisions. The identification number for each responding personal communicator is stored by the receiving remote base station 28r and retransmitted via the radio messaging system to the service node 24 for storage in the look-up table so as to update the current position of the subscriber 10.

Determining the location of a subscriber 10 who is outside the range of the assigned primary base station 28rp is important in order to relay alert messages concerning incoming phone calls when the subscriber is not at and therefore unable to answer the phone at any of the primary locations (home 12, office 14 or vehicle 16). If the system knows where the subscriber 10 is approximately located (last reported remote base station 28r area), the service node can send an alert message to the subscriber's personal communicator 26 via the radio messaging system network to notify the subscriber of the incoming phone call. The personal communicator thus acts in a manner similar to a pager by beeping and displaying an incoming call message. Also, in emergency situations, the service node 24 can direct each remote base station 28r to broadcast an alert emergency signal to a specific personal communicator identification number when the exact location of the personal communicator is unknown.

The personal communicator 26 is a credit card sized transceiver that may by carried by the subscriber 10 in a wallet, purse or briefcase or clipped to the subscriber's clothing like a security badge. The personal communicator performs several major functions. First, upon receipt of a broadcast request from a remote base station 28r, the personal communicator 26 can respond with a notification of presence to enable the service node 24 to locate to the subscriber. Second, through included input keys, the personal communicator 26 can transmit messages and commands to the service node 24 via the radio messaging system. Third, the personal communicator 26 can receive messages transmitted from the service node 24 via the radio messaging system regarding incoming calls to the subscriber's 10 personal telephone number. Fourth, through a number of included display devices, the personal communicator can provide status information to the subscriber 10.

Upon receipt of an alert message from the service node 24 regarding the incoming phone call, the subscriber 10 is presented with a multitude of options. Through the included input keys, the subscriber 10 can choose and activate a number of system features to handle incoming phone calls whether or not the subscriber is at a primary location (home 12, office 14 or vehicle 16). For example, with the "hold" function activated through the personal communicator 26 function input keys, a message is relayed to the service node 24 over the radio message system to place the incoming call to the subscriber's 10 personal telephone number on hold while the subscriber proceeds to the nearest phone. If the nearest phone is also a phone at one of the subscriber's primary locations, the subscriber can depress the "deliver" key on the personal communicator (delivering the message over the radio message system) and the call will be routed to the primary location phone. If the nearest phone is not a phone at a primary location, the subscriber can go to the phone, read the phone number, enter that number into the personal communicator 26, and transmit the number to the service node 24 via the radio messaging system by depressing the "transfer" key. The service node will then redirect the incoming call to the number specified by the subscriber.

The subscriber 10 can also choose, through the function input keys on the personal communicator, to have the system "take a message" on the incoming call. This command will be transmitted via the radio messaging system to the service node 24 where a recorded message asking the incoming caller to leave a message will be played. Additionally, the subscriber can choose, through the "do not disturb" function key, to disable the pager function and have all incoming calls immediately transferred for the caller to leave a recorded message.

Other features and services, originating with each subscriber and the personal communicator function keys, are available to the subscriber through the radio messaging system and the service node. These services are available to the subscriber regardless of the subscriber's location. For example, the subscriber can dial up and access the service node and use speed dialing, three-way calling, call waiting, voice activated dialing or other features to assist the subscriber in placing calls from the service node. With the system of the present invention, these calling services are also available to the subscriber at any location through the personal communicator and service node via the radio messaging system and a telephone link at a primary location. In addition, the subscriber can signal, through the personal communicator, an emergency situation. This signal will be transmitted to the service node over the radio messaging system. The service node will then contact emergency services, for example by dialing "911", and provide location information on the subscriber to the service. The subscriber can also attach a mini alphanumeric keyboard to the personal communicator for entry and transmission to the service node over the radio messaging system of text messages.

Figure 2:
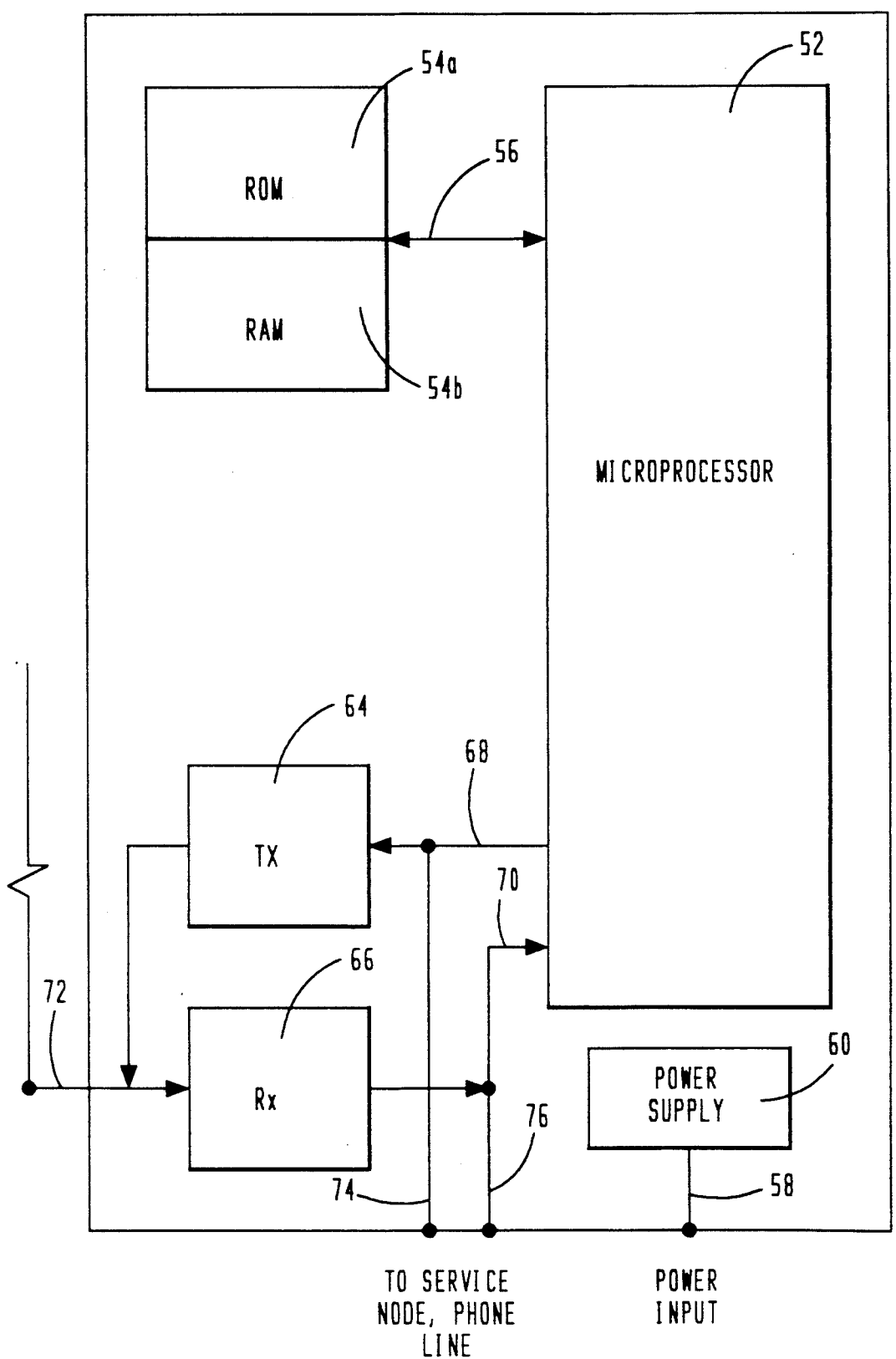
FIG. 2 is a block diagram for the base station utilized by the personal telecommunications system.

Referring now to FIG. 2, there is shown a block diagram for a base station 28 (whether remote or central) utilized by the personal telecommunications system of the present invention. A dedicated microprocessor 52 handles all data processing functions of and directs all communications to and from the base station 28 including executing a communications application program. The applications program for the base station 28 is stored in a read-only memory (ROM) 54a. A random-access memory (RAM) 54b is also included to provide a temporary, variable usage memory for temporary storage of applications program parameters, other data and communications. Data bus 56 couples the microprocessor 52 to the memory area 54.

A power input 58 is provided to supply operating power to the microprocessor 52 and all other components of the base station 28. A power supply circuit 60 couples the power input 58 to the microprocessor 52 and other components of the base station 28. If the base station is located at the service node, home or office, or is being operated as a relay base station 28rr, the power input receives AC power and the power circuit converts the unregulated AC to regulated DC power to operate the base station 28 components. If the base station is located at a subscriber's vehicle, the power input receives DC power from the vehicle electrical system and the power circuit converts the power provided as required by the operating components of the base station 28.

The applications program executed by the microprocessor 52 is designed, when power is first applied, to cause the base station 28 to poll for each assigned personal communicator. Thus, with the starting of a vehicle, the base station therein would automatically broadcast an "are you there?" message to its assigned personal communicator. Thus, the base station 28rp in the vehicle, and the service node, are immediately notified of the changed location of the subscriber. In addition, the broadcast by the base station 28rp also functions as an alarm in that a failure of the assigned personal communicator to respond indicates that an unauthorized person has started the vehicle. Alarm notice can then be transmitted to the service node via the radio messaging system. When the vehicle is turned off, the base station 28 therein maintains power for long enough to send a message to the service node that the subscriber is no longer present for communication at the vehicle's cellular phone. This automatic polling feature would also occur with other remote base station in the event of a power failure.

The base station 28 externally communicates through use of one of two means. The first means is a transmitter circuit 64 and receiver circuit 66 (radio transceiver) connected to the microprocessor 52 through lines 68 and 70, respectively, for external radio communication using external antenna 72. Second, the base station 28 can be connected, via normal telephone lines 74 and 76 to a service node or an associated telephone. With the first communications means, the base station 28 broadcasts and receives messages over the radio message system of the personal telecommunications system of the present invention. With the second communications means, the base station functions as either a central base station 28c or primary base station 28rp as described above with respect to FIG. 1, with the telephone connection (74 and 76) enabling the base station to maintain contact with the service node in the event the radio messaging system should fail.

Figure 3:
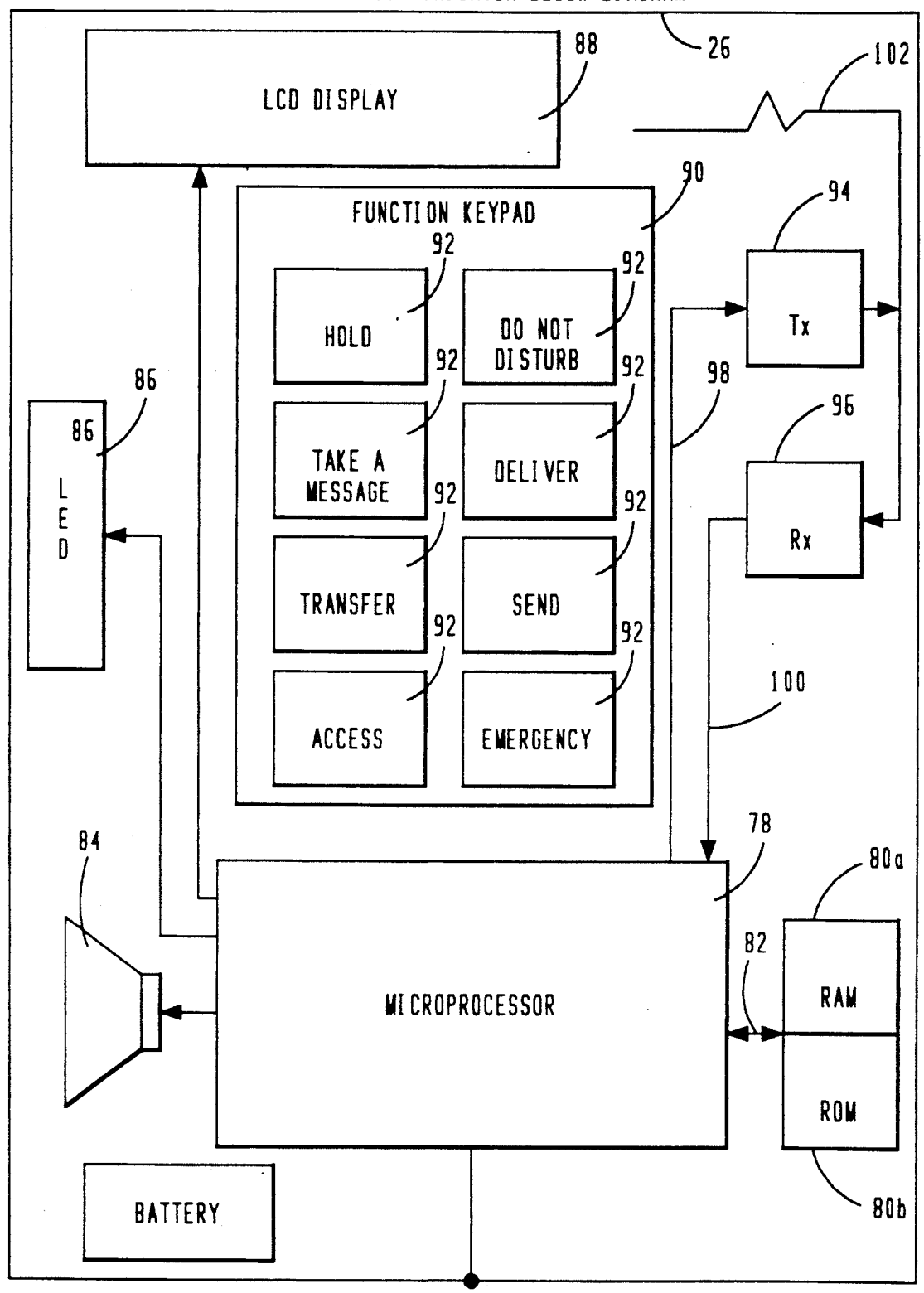
FIG. 3 is a block diagram for the personal communicator carried by the subscriber.

Referring now to FIG. 3, there is shown a block diagram for the personal communicator 26 carried by the subscriber 10 A dedicated microprocessor 78 handles all data processing functions of and directs all communications to and from the personal communicator 26 including executing a communications application program and function control program. The applications and function control programs for the personal communicator 26 are stored in a read-only memory (ROM) 80a. A random-access memory (RAM) 80b is also included to provide a temporary, variable usage memory for temporary storage of applications program parameters, other data and communications. Data bus 82 couples the microprocessor 78 to the memory 80. A battery is also provided to power the components of the personal communicator 26.

Also connected to the microprocessor 78 are three output devices; a speaker 84, an LED display 86 and an LCD character display 88. These devices enable the personal communicator 26 to notify the subscriber of an incoming phone call to the subscriber's personal telephone number. The speaker 84 and LED display 86 provide audible and visual notice of the call while the LCD display 88 provides a written message for the subscriber regarding the incoming call.

A function keypad 90 is provided to input data into the microprocessor 78. The function keypad 90 includes numeric keys (not shown) for entering phone numbers, and a number of special purpose keys 92, including keys for performing the "hold", "do not disturb", "take a message", "transfer" and "deliver" functions described above with respect to FIG. 1, as well as keys for other functions as described below or specially programmed into the personal communicator. The commands for performing the selected function may be transmitted by radio signal to a base station over the radio messaging system or audibly to the service node over the conventional telephone or cellular communications line.

When the audible transmission is used, the relevant data is output in DTMF format through the output speaker 84. This transmission method will be necessary when the subscriber wishes to perform a remote log-in from a location that is not within radio transmission range of the radio messaging system. This will typically be the case when the subscriber is out of town, but still wants to be accessible for phone calls. The subscriber will then use the telephone and the personal communicator to create a temporary primary location to which incoming calls will be transferred, for example to a hotel room, by the service node. The subscriber will first enter the local phone number and a time of stay at that number into the personal communicator and then access the service node by telephone. Then, the subscriber simply holds the speaker 84 of the communicator 26 up to the phone and depresses a remote login key causing the microprocessor 78 to execute the function applications program and output over the speaker the personal communicator identification number in DTMF format, the transfer phone number and time to the service node to enable proper transfer of the incoming call to the subscriber.

In other situations, depressing a function key 92 will cause the function message to be output by the microprocessor 78, according to the function applications program, using a radio transceiver circuit. The radio transceiver circuit is comprised of a transmitter circuit 94 and receiver circuit 96 connected to the microprocessor 78 via lines 98 and 100, respectively, for message transmission and reception using an internal antenna 102 to a base station. Thus, when the subscriber is notified of an incoming call by speaker 84 and LED display 86, the subscriber can depress the "hold" or "take a message" keys 92 and the appropriate message will be transmitted to a base station and relayed to the service node for processing via the radio tracking system.

With additional function keys 92 provided on the personal communicator and function applications programs stored in the memory 80, other features and services, originating with each subscriber, are available to the subscriber through the radio messaging system and the service node. These services are available to the subscriber regardless of the subscriber's location. For example, the subscriber can dial up and access the service node from any phone and use speed dialing, three-way calling, call waiting, voice activated dialing or other features provided by the system to assist the subscriber in placing calls. The subscriber can also depress the "access" function key on the personal communicator 26 to cause the service node to determine the subscriber's current primary location and call the phone at that location for further use by the subscriber and access to the originating services as described above. With the system of the present invention, these calling services are available to the subscriber at any location through the personal communicator and service node via the radio messaging system and a telephone link. Other keys may be left unlabeled and programmed for specific uses requested by the subscriber.

In addition, the subscriber can signal, through depressing the "emergency" key on the personal communicator keypad, an emergency situation. This signal will be transmitted to the service node over the radio messaging system. The service node will then contact emergency aid, for example by dialing "911", and provide location information on the subscriber through the radio messaging system as described above.

The subscriber can also attach a mini alphanumeric keyboard, preferably of the QWERTY type, to a port on the personal communicator for entry and transmission to the service node over the radio messaging system of text messages. These messages are stored by the microprocessor 78 in the RAM memory 80b and viewed on the LCD display 88. Through the attached keyboard, the subscriber can edit and review the message. Using the "send" key on the keypad 90, the stored text message is transmitted via the radio messaging system to the service node. Upon receipt, the service node determines if the message is to be delivered to a person or a facsimile machine and formats the message for subsequent transmission to its intended destination. If the message is intended for someone without access to a facsimile machine or personal communicator, the person is called over the telephone network and the message is delivered using a text-to-speech conversion for audible message relay. Messages for other personal communicator users are redirected by the service node back over the radio messaging system to the personal communicator where an alert message is given and the message displayed on the personal communicator display.

Although a preferred embodiment of the personal telecommunications system of the present invention has been illustrated in the accompanying Drawings and described in the foregoing Detailed Description, it will be understood that the invention is not limited to the embodiment disclosed, but is capable of numerous rearrangements, substitutions and modifications without departing from the spirit of the invention.

I claim:

1. A personal telecommunications system, comprising:

telephone switching means connected to a plurality of telephones at locations designated by system subscribers;

means for determining the presence of a subscriber at one of the designated locations proximate to a telephone connected to the telephone switching means and for outputting a subscriber location signal indicating that the subscriber is present at a certain one of the designated locations to receive an incoming call dialed to a personal telephone number assigned to the subscriber and forwarded to the telephone at the certain designated location indicated by the location signal;

personal transceiver means assigned to the subscribers including means for transmitting at any time in response to a subscriber input a subscriber instruction signal specifying an alternative manner of handling the incoming call dialed to the personal telephone number of the subscriber; and control means for receiving the subscriber location signal, the subscriber instruction signal and the incoming call placed by the caller to the personal phone number assigned to the subscriber, said control means including means for either forwarding the received incoming call to the subscriber by routing the incoming call through the telephone switching means to the telephone at the certain designated location indicated by the received subscriber location signal, or for alternatively handling the incoming call in the manner specified by the subscriber in response to the received subscriber instruction signal transmitted by means of the personal transceiver means.

2. The personal telecommunications system as in claim 1 wherein the control means further comprises means for storing the certain designated location of the subscriber indicated by the location signal, and for identifying a telephone number for the telephone proximate to the certain designated location, the means for forwarding of the control means including means for dialing the identified telephone number to route the incoming call dialed to the personal telephone number of the subscriber to the telephone proximate to the certain designated location.

3. A personal telecommunications system for handling an incoming call made to a personal telephone number assigned to a system subscriber, comprising:

a personal transceiver carried by the subscriber including means for transmitting at any time in response to a subscriber input a call completion message designating the manner the subscriber desires to have the incoming call to the personal telephone number handled;

a system communications network including means for identifying from a communication with the subscriber personal transceiver the current location of the subscriber and generating a message indicative thereof, and means for transmitting the call completion message and the current subscriber location message;

a telephone switching network separate from the communications network for routing telephone calls, said telephone switching network connected to a plurality of telephones including a telephone proximate to the current location of the subscriber; and control means connected to the system communications network for receiving the current subscriber location message and the call completion message transmitted by the system communications network, and for routing the incoming call through the telephone switching network in accordance with the subscriber location message to the telephone proximate to the identified location of the subscriber, or for alternatively handling the incoming call in accordance with the manner specified by the subscriber in the call completion message transmitted by means of the personal transceiver.

4. The personal telecommunications system as in claim 3 wherein the subscriber instruction signal further includes a call forwarding command and wherein the means for alternatively handling of the control means further utilizes the means for forwarding to forward the held call.

5. The personal telecommunications system as in claim 3 wherein the system communications network comprises a wireless radio link for transmitting the location message and the call completion message and the separate telephone switching network comprises a public telephone switched network.

6. The personal telecommunications system as in claim 3 wherein the call completion message comprises a hold command, the control means further including means responsive to the hold command for placing the incoming call on hold.

7. The personal telecommunications system as in claim 3 wherein the call completion message comprises a message command, the control means further including means responsive to the message command for recording a message from the caller.

8. The personal telecommunications system as in claim 3 wherein the call completion message comprises a forward command, the control means further including means responsive to the forward command for forwarding the incoming call to a telephone identified by the subscriber.

9. The personal telecommunications system as in claim 3 wherein:

the control means further includes means responsive to receipt of the incoming call for generating and transmitting an incoming call alert message over the system communications network to the subscriber; and the personal transceiver further includes means for receiving the alert message to notify the subscriber of the incoming call, with the subscriber inputting the call completion message transmitted by means of the personal transceiver in response to receipt of the alert signal.

10. The personal telecommunications system as in claim 3 wherein the means for routing comprises:

means for identifying a number for the telephone at the identified current location and forwarding the incoming call through the telephone switching network by dialing the identified number.

11. A personal telecommunications system, comprising:

a personal communicator assigned to system subscribers including means for receiving an alert signal notifying a subscriber of a telephone call dialed to a personal telephone number assigned to the subscriber, means for subscriber entry of call completion directions in response to the receipt of the alert signal and means for transmitting a call completion message comprising the call completion directions entered by the subscriber;

a communications network for relaying the alert signal to the personal communicator and for relaying the call completion message transmitter by the subscriber in response to the alert signal; and a telephone service node connected to a telephone network and the communications network including: means for receiving the telephone call dialed to the personal telephone number assigned to the subscriber; means responsive to receipt of the telephone call for generating and transmitting the alert signal over the communications network to the personal communicator; means responsive to receipt of the call completion message for retrieving the call completion directions; and, means for completing the call in accordance with the call completion directions input and transmitted by the subscriber.

12. The personal telecommunications system as in claim 11 wherein the call completion directions comprise a forward command including a number for a telephone proximate to the current location of the subscriber, the means for completing of the service node comprising means for routing the incoming call dialed to the personal telephone number to the number for the telephone proximate to the subscriber.

13. The personal telecommunications system as in claim 11 wherein the call completion directions comprise a hold command, the means for completing of the service node comprising means for placing the incoming call dialed to the personal telephone number on hold.

14. The personal telecommunications system as in claim 11 wherein the call completion directions comprise a message command, the means for completing of the service node comprising means for taking a message from the caller of the incoming call dialed to the personal telephone number.

15. The personal telecommunications system as in claim 11 wherein the call completion directions comprise a forward command for transferring the incoming call dialed to the personal telephone number to a telephone proximate to the current location of the subscriber, the system further comprising:

means for identifying the current location of the subscriber and means for determining a number for a telephone at the identified location, the means for completing of the service node comprising means for routing the incoming call dialed to the personal telephone number to the determined number for the telephone at the identified location.

16. The personal telecommunications system as in claim 11 wherein the call completion directions comprise a text message input into the personal communicator by the subscriber describing the manner of call completion, the means for completing of the service node comprising means for interpreting the text message and completing the call in the manner described by the text message.

17. The personal telecommunications system as in claim 11 wherein the call completion directions comprise a text message input into the personal communicator by the subscriber, the means for completing of the service node comprising means for delivering the text message to the incoming caller.

18. The personal telecommunications system as in claim 11 wherein the personal communicator further includes means for subscriber entry of a telephone number for the telephone selected by the subscriber.

19. The personal telecommunications system as in claim 18 wherein the means for configuring comprises:
means for receiving the entered telephone number;
means for dialing the entered telephone to call the selected telephone; and
means responsive to subscriber accessing of the called selected telephone for enabling subscriber use of the selected calling service.

20. The personal telecommunications system as in claim 18 further including means responsive to the command signal for determining the current location of the subscriber and for identifying a telephone proximate to the determined current location, the means for configuring comprising:
means for obtaining the telephone number for the telephone at the determined current location;
means for dialing the obtained telephone number to call the telephone at the determined current location; and
means responsive to subscriber accessing of the called selected telephone for enabling subscriber use of the selected calling service.

21. A personal telecommunications system, comprising:
telephone switching means connected to a plurality of telephones at locations designated by system subscribers;
means for determining the presence of a subscriber at one of the designated locations proximate to a telephone connected to the telephone switching means and for outputting a subscriber location signal indicating that the subscriber is present at a certain one of the designated locations to receive an incoming call dialed to a personal telephone number assigned to the subscriber and forward to the telephone at the certain designated location indicated by the location signal;
personal transceiver means assigned to the subscribers including means for transmitting at any time in response to a subscriber input a subscriber instruction signal specifying that an incoming call dialed to the personal telephone number of the subscriber should be completed by taking a message from the caller; and
control means for receiving the subscriber location signal, the subscriber instruction signal and the incoming call placed by the caller to the personal telephone number assigned to the subscriber, said control means including means for either forwarding the received incoming call to the subscriber by routing the incoming call through the telephone switching means to the telephone at the certain designated location identified by the received subscriber location signal, or for alternatively completing the incoming call in the manner specified by the subscriber in the received subscriber instruction signal by taking a message from the caller.

22. A personal telecommunications system, comprising:
telephone switching means connected to a plurality of telephones at locations designated by system subscribers;
means for determining the presence of a subscriber at one of the designated locations proximate to a telephone connected to the telephone switching means and for outputting a subscriber location signal indicating that the subscriber is present at a certain one of the designated locations to receive an incoming call dialed to a personal telephone number assigned to the subscriber and forwarded to the telephone at the certain designated location indicated by the location signal;

personal transceiver means assigned to the subscribers including means for transmitting at any time in response to a subscriber input a subscriber instruction signal specifying that an incoming call dialed to the personal telephone number of the subscriber should be completed by forwarding the call to a telephone at a location other than the certain designated location; and control means for receiving the subscriber location signal, the subscriber instruction signal and the incoming call placed by the caller to the personal telephone number assigned to the subscriber, said control means including means for either forwarding the received incoming call to the subscriber by routing the incoming call through the telephone switching means to the telephone at the certain designated location identified by the received subscriber location signal, or alternatively forwarding the incoming call in the manner specified by the subscriber in the received subscriber instruction signal transmitted by the personal receiver means to the telephone at the location other than the certain designated location.

23. A personal telecommunications system, comprising:

telephone switching means connected to a plurality of telephones at locations designated by system subscribers;

means for determining the presence of a subscriber at one of the designated locations proximate to a telephone connected to the telephone switching means and for outputting a subscriber location signal indicating that the subscriber is present at a certain one of the designated locations to receive an incoming call dialed to a personal telephone number assigned to the subscriber and forwarded to the telephone at the certain designated location indicated by the location signal;

personal transceiver means assigned to the subscribers including means for transmitting at any time in response to a subscriber input a subscriber instruction signal specifying that an incoming call dialed to the personal telephone number of the subscriber should be completed by placing the call on hold; and control means for receiving the subscriber location signal, the subscriber instruction signal and the incoming call placed by the caller to the personal telephone number assigned to the subscriber, said control means including means for either forwarding the received incoming call to the subscriber by routing the incoming call through the telephone switching means to the telephone at the certain designated location identified by the received subscriber location signal, or for alternatively completing the incoming call in the manner specified by the subscriber in the received subscriber instruction signal by placing the call on hold.

24. A personal telecommunications system, comprising:

telephone switching means connected to a plurality of telephones at locations designated by system subscribers;

means for determining the presence of a subscriber at one of the designated locations proximate to a telephone connected to the telephone switching means and for outputting a subscriber location signal indicating that the subscriber is present at a certain one of the designated locations to receive an incoming call dialed to a personal telephone number assigned to the subscriber and forwarded to the telephone at the certain designated location indicated by the location signal;

means responsive to receipt of an incoming call dialed to the personal telephone number of the subscriber for generating and transmitting an incoming call alert signal;

personal transceiver means assigned to the subscribers including means for receiving the incoming call alert signal notifying the subscriber of the incoming call, said personal transceiver means further including means for transmitting in response to receipt of the alert signal and a subscriber input an instruction signal specifying a manner with which the incoming call dialed to the personal telephone number of the subscriber should be completed; and control means for receiving the subscriber location signal, the subscriber instruction signal and the incoming call placed by the caller to the personal telephone number assigned to the subscriber, said control means including means for either forwarding the received incoming call to the subscriber by routing the incoming call through the telephone switching means to the telephone at the certain designated location identified by the received subscriber location signal, or for alternatively completing the incoming call in the manner specified by the subscriber in the received subscriber instruction signal transmitted in response to the alert signal.

25. A personal telecommunications system, comprising:

a telephone switching network connected to a plurality of telephones;

a personal communicator assigned to system subscribers including means responsive to a subscriber input for transmitting a command signal selecting the implementation of one of a plurality of calling services for use by the subscriber from a selected one of the plurality of telephones;

a communications network separate from the telephone switching network for transmitting the command signal from the personal communicator; and a telephone service node connected to both the telephone switching network and the communications network, the service node providing the plurality of calling services available for subscriber use and having means responsive to the receipt of the command signal transmitted over the communications network for configuring the telephone switching network to connect the service node to the selected telephone for subscriber access to the service node and for implementation of the selected calling service at the service node for use by the subscriber from the subscriber selected and accessed telephone.

26. The personal telecommunications system as in claim 1 wherein the subscriber instruction signal comprises a text message input into the personal transceiver means by the subscriber describing the manner of call handling, the means for handling of the control means comprising means for interpreting the text message and completing the call in the manner described by the text message.

27. The personal telecommunications system as in claim 1 wherein the subscriber instruction signal comprises a text message input into the personal transceiver means by the subscriber, the means for handling of the control means comprising means for delivering the text message to the incoming caller.

* * * * *

Adverse Decisions in Interference

Patent No. 5,315,636, Rajendra Patel, PERSONAL TELECOMMUNICATIONS SYSTEM, Interference No. 104,166, final judgment adverse to the patentee rendered February 3, 1999, as to claims 11, 13, 14, 18, 19 and 25.

*(Official Gazette May 25, 1999)*

Adverse Decisions in Interference

Patent No. 5,315,636, Rajendra Patel, PERSONAL TELECOMMUNICATIONS SYSTEM, Interference No. 104,166, final judgment adverse to the patentee rendered February 3, 1999, as to claims 11, 13, 14, 18, 19 and 25.

*(Official Gazette June 8, 1999)*